(12) United States Patent
Martinez, III

(10) Patent No.: US 10,059,075 B2
(45) Date of Patent: Aug. 28, 2018

(54) PREFORMS FOR USE IN MANUFACTURING COMPOSITE STRUCTURES AND METHODS OF MAKING SUCH PREFORMS

(71) Applicant: GOODRICH CORPORATION, Charlotte, NC (US)

(72) Inventor: Modesto Martinez, III, Pueblo, CO (US)

(73) Assignee: GOODRICH CORPORATION, Charlotte, NC (US)

(\*) Notice: Subject to any disclaimer, the term of this patent is extended or adjusted under 35 U.S.C. 154(b) by 1094 days.

(21) Appl. No.: 14/312,155

(22) Filed: Jun. 23, 2014

(65) Prior Publication Data

US 2015/0367592 A1 Dec. 24, 2015

(51) Int. Cl.

| B32B 1/08 | (2006.01) |
|---|---|
| B32B 5/26 | (2006.01) |
| B29C 67/00 | (2017.01) |
| B33Y 80/00 | (2015.01) |
| B33Y 10/00 | (2015.01) |
| B29B 11/16 | (2006.01) |
| C04B 35/83 | (2006.01) |

(52) U.S. Cl.
CPC ............... *B32B 1/08* (2013.01); *B29B 11/16* (2013.01); *B29C 67/0055* (2013.01); *B29C 67/0074* (2013.01); *B32B 5/26* (2013.01); *B33Y 10/00* (2014.12); *B33Y 80/00* (2014.12); *C04B 35/83* (2013.01); *B32B 2262/02* (2013.01); *B32B 2475/00* (2013.01); *Y10T 428/13* (2015.01)

(58) Field of Classification Search
CPC ......... B32B 1/08; B32B 5/26; B32B 2262/02; B32B 2475/00; B29C 67/0074; B29C 67/0055; B33Y 80/00; B33Y 10/00; Y10T 428/13; B29B 11/16; C04B 35/83
See application file for complete search history.

(56) References Cited

U.S. PATENT DOCUMENTS

| 5,936,861 | A | 8/1999 | Jang et al. |
| 6,009,605 | A | 1/2000 | Olry et al. |
| 6,248,417 | B1 | 6/2001 | Ponsolle et al. |
| 7,384,663 | B2 | 6/2008 | Olry et al. |
| 8,216,641 | B2 | 7/2012 | Bouchard et al. |
| 8,268,393 | B2 | 9/2012 | Rollin et al. |

FOREIGN PATENT DOCUMENTS

| DE | 102011109369 | 2/2013 |
| DE | 202013002419 | 6/2013 |
| WO | 2005111292 | 11/2005 |
| WO | WO2012066352 | 5/2012 |

OTHER PUBLICATIONS

Extended European Search Report dated Nov. 27, 2015 in European Application No. 15172312.9.

*Primary Examiner* — Michael C Miggins
(74) *Attorney, Agent, or Firm* — Snell & Wilmer, L.L.P.

(57) ABSTRACT

A preform manufactured by an additive manufacturing process is provided. The preform may include an annular fibrous layer made from a polymeric material, such as PAN. The annular fibrous layer may comprise one or more of a non-uniform areal weight profile, non-uniform fiber volume profile, and a non-uniform fiber density profile. Such profiles may vary in either or both of the radial and axial directions, as well as in localized regions of the preform.

18 Claims, 3 Drawing Sheets

PREFORMS FOR USE IN MANUFACTURING COMPOSITE STRUCTURES AND METHODS OF MAKING SUCH PREFORMS

FIELD

The present disclosure relates to components of wheel and brake assemblies, and more specifically, to preforms made using additive manufacturing.

BACKGROUND

Conventional carbon composite formation includes creating a net-shaped preform using a circular needle loom (CNL). However, CNLs typically produce orthogonal (rectangular) structures that are then punched or cut into circular/annular systems/structures creates waste scrap products. Further, fabric-based preforms are limited in their design by the characteristics of the fabrics, as well as the multiple layers of fabric required to produce the preform.

SUMMARY

An exemplary preform may comprise an annular fibrous layer having a first surface, an inner diameter, an outer diameter, a radius, an axis and a commercially viable thickness, wherein the annular fibrous layer comprises a predetermined areal weight profile, a predetermined fiber volume profile, and a predetermined fiber density profile, at least one of which is non-uniform. The annular fibrous layer may be formed by an additive manufacturing process. The preform may include a lug section, wherein a fiber density profile along one of a radius or an axis comprises a fiber density that is greater at a point at or near the lug section than a fiber density at the inner diameter. A predetermined areal weight profile, predetermined fiber volume profile, and/or a predetermined fiber density profile may vary along the radius such that the areal weight, fiber volume, and/or fiber density is greater at a point along the outer diameter than at a point along the inner diameter. The predetermined areal weight profile, predetermined fiber volume profile, and/or predetermined fiber density profile may vary along the axis such that the areal weight, fiber volume, and/or fiber density is greater at or near a first surface than at a point approximately half of the thickness of the annular fibrous layer.

A method for manufacturing a preform using an additive manufacturing process may comprise defining a preform design comprising an annular fibrous layer having an axis and a radius and one of a non-uniform predetermined areal weight profile, a non-uniform predetermined fiber volume profile, or a non-uniform predetermined fiber density profile, and forming the preform design using an additive manufacturing process, such as a fused deposition modeling process. The preform design may further comprise a lug section, wherein a fiber density profile along one of a radius or an axis comprises a fiber density that is greater at a point at or near the lug section than a fiber density at an inner diameter of the preform design. The annular fibrous layer may comprise a non-uniform areal weight profile, a non-uniform fiber volume profile, and/or a non-uniform fiber density profile that varies along the radius and/or the axis.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1A:
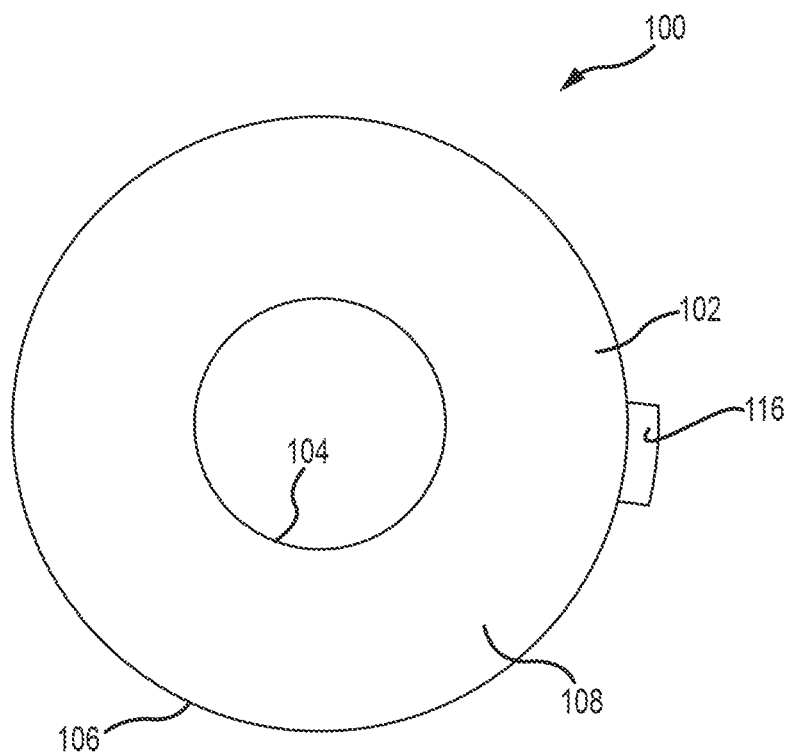
FIGS. 1A and 1B illustrate a top view and a side view, respectively, of a preform in accordance with the present disclosure.

The detailed description of exemplary embodiments herein makes reference to the accompanying drawings, which show exemplary embodiments by way of illustration. While these exemplary embodiments are described in sufficient detail to enable those skilled in the art to practice the inventions, it should be understood that other embodiments may be realized and that logical changes and adaptations in design and construction may be made in accordance with this invention and the teachings herein. Thus, the detailed description herein is presented for purposes of illustration only and not of limitation. The scope of the invention is defined by the appended claims. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Furthermore, any reference to singular includes plural embodiments, and any reference to more than one component or step may include a singular embodiment or step.

As used herein, the term "additive manufacturing" encompasses any method or process whereby a three-dimensional object is produced by creation of a substrate or material, such as by addition of successive layers of a material to an object to produce a manufactured product having an increased mass or bulk at the end of the additive manufacturing process than the beginning of the process. In contrast, traditional manufacturing (e.g., forms of subtractive manufacturing) by machining or tooling typically relies on material removal or subtractive processes, such as cutting, lathing, drilling, grinding, and/or the like, to produce a final manufactured object that has a decreased mass or bulk relative to the starting workpiece. Other traditional manufacturing methods includes forging or casting, such as investment casting, which utilizes the steps of creating a form, making a mold of the form, and casting or forging a material (such as metal) using the mold. As used herein, the term "additive manufacturing" should not be construed to encompass fabrication.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Typical carbon composite brake pads are formed by creating a preform, then using the preform to form the carbon composite brake pad. Carbon-carbon C/C material is generally formed by utilizing either continuous oxidized polyacrylonitrile (PAN) fibers, referred to as "OPF" fibers or carbonized carbon fibers, referred to herein as carbon fibers. Such fibers are used to fabricate a preform shape using a needle punching process. OPF fibers or carbon fibers are layered in a selected orientation into a preform of a selected geometry. Typically, two or more layers of fibers are layered onto a support and are then needled together simultaneously or in a series of needling steps. This process interconnects the horizontal fibers with a third direction (also called the z-direction). The fibers extending into the third direction are also called z-fibers. This needling process may involve driving a multitude of barbed needles into the fibrous layers to displace a portion of the horizontal fibers into the z-direction.

Conventionally, a yarn or fiber tow is laid radially to form an annular disc shaped preform layer from the inner diameter of the preform (the "ID") to the outer diameter of the preform (the "OD"). Gaps typically occur between the fiber tows farther from the ID. Stated another way, when viewed with respect to unit areal weight, e.g., the amount of mass per area, extending from the inner diameter to the outer diameter, the fiber tow volume and/or the areal weight decrease due to larger gaps between the adjacent fiber tows. Alternatively, overlapping occurs at the ID which leads to uneven surfaces.

For instance, during a chemical vapor infiltration/chemical vapor deposition process, carbon may be deposited onto fiber tows. However, if no fiber tows are present, such as in the case of a gap, then the carbon deposition process is stymied. This may create a pore in the carbon-carbon composite. Pores in a carbon-carbon composite may collect debris, fluid, gas, etc. Further, pores may lead to oxidation. Conventional attempts to reduce these issues may include layering sectors of a disc shape preform from a two dimensional fabric cut from another shape, such as a rectangular shaped piece of fabric. These sectors may be overlapped or abutted as predetermined. Discontinuities may result from the joint locations of two abutted sectors and/or at the overlapping layers. A layer of a preform where discontinuities are observed likely results in a non-uniform areal weight. For instance, in the case where two sectors overlap by half an inch, in that half an inch area the areal weight is double that of the rest of the layer. This may create high spots and low spots in the layer. Also, in the case of abutted sectors, if the abutted areas are layered the composite strength is greatly reduced.

Other properties of preforms include fiber volume and fiber density. As used herein, "fiber volume" refers to the percentage or fraction of a specified volume within a specific portion or segment of a preform that is occupied by fiber. As used herein, "fiber density" refers to the mass of fiber contained in a specified volume within a specific portion or segment of a preform.

As used herein, "profile" refers to the contour and characteristics of a given property in a specific direction or orientation within a preform. For example, a "fiber volume profile" in a radial direction would refer to the specific quantitative values of the fiber volume at various points along the radial direction, including the manner in which the fiber volume changes or remains uniform or constant in the radial direction.

As used herein, "predetermined" refers to a characteristic or orientation that is designed, planned, or otherwise calculated. For example, a "predetermined fiber volume profile" would refer to a fiber volume profile that is intended and desired, as opposed to a fiber volume profile that was unplanned, unintended, and/or undesired.

Therefore, a preform having predetermined characteristics, such as a predetermined areal weight, fiber volume, and fiber density at various points in the preform may be beneficial. As will be discussed in greater detail, forming a preform using additive manufacturing methods such as three-dimensional polymeric printing may provide the ability to vary one or more of these characteristics. Further, although a preform manufactured using three-dimensional polymeric printing does not necessarily comprise a plurality of fibers, for the sake of consistency and clarity, various attributes and aspects of the present disclosure will be described with reference to fiber characteristics (such as, for example, fiber volume and fiber density).

Further, a preform formed as a single layer would eliminate the need to needle multiple layers of fabric together to achieve a commercially viable thickness. In addition, forming a preform in its predetermined annular shape may eliminate a significant amount of wasted fibrous fabric material.

Figure 1B:
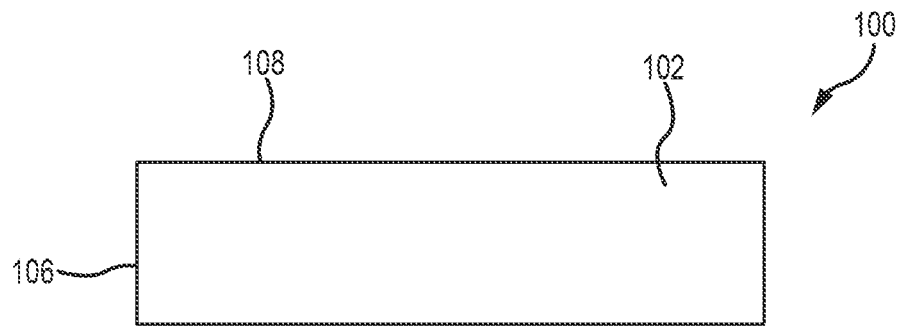

With reference to FIGS. 1A and 1B, a preform 100 is illustrated. In various embodiments, preform 100 comprises an annular shape having an inner diameter 104 and an outer diameter 106. Further, preform 100 may comprise, for example, a first surface 108. Further, preform 100 may comprise a thickness "t."

In various embodiments, preform 100 comprises a single annular fibrous layer 102. As previously discussed, although annular fibrous layer 102 is described as "fibrous," it may, in fact, comprise non-fibrous structures or portions. Annular fibrous layer 102 may comprise a single layer formed by a three-dimensional printing process, as will be discussed further. For example, annular fibrous layer 102 may comprise a plurality of individual fibers, a single fiber, non-fibrous structures, or any combination thereof. In various embodiments, "t" is a commercially viable thickness of preform 100. Stated another way, single annular fibrous layer 102 comprises a single layer of thickness "t," and does not require the combination of multiple fabric-based layers to produce a commercially viable preform 100.

Figure 2A:
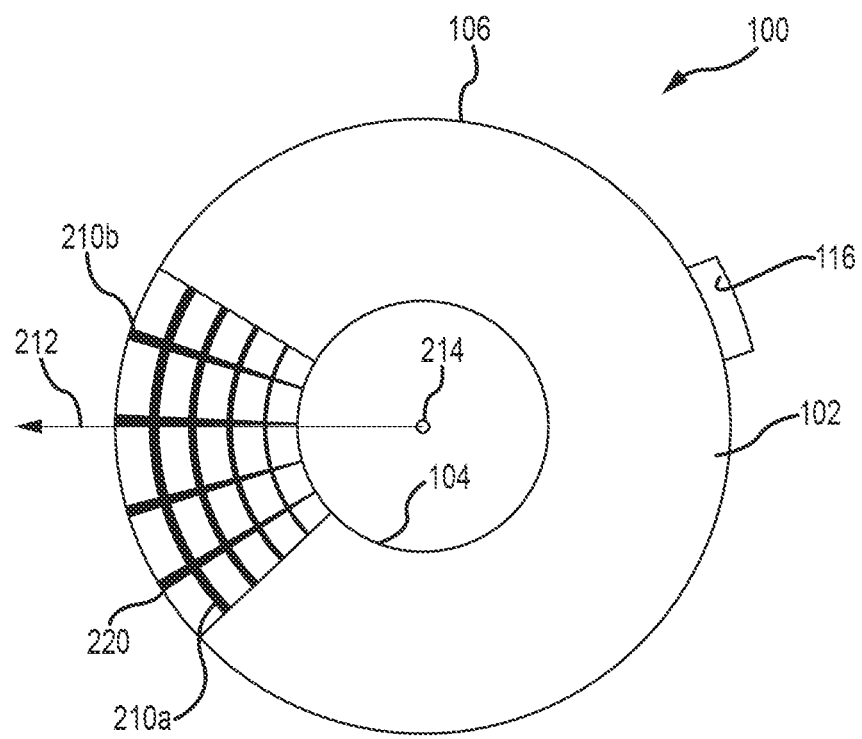
FIGS. 2A and 2B illustrate cross sectional views of a preform in accordance with the present disclosure.
Figure 2B:
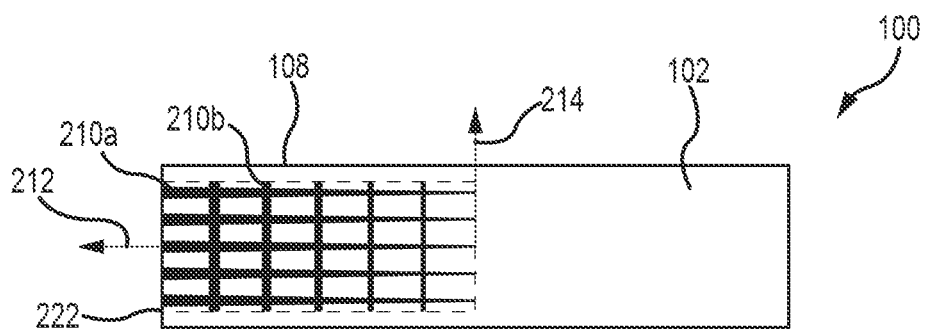

For example, and with reference to FIGS. 2A and 2B, annular fibrous layer 102 may comprise one or more fibers, such as, for example, fibers 210a and 210b. In various embodiments, fibers 210a and 210b may have different configurations and/or shapes from each other. Further, fibers 210a and 210b may have different characteristics from each other, including thickness, composition, and density, among other characteristics. Further, various characteristics of fibers 210a and 210b may be varied along the length of the fibers to produce predetermined properties of annular fibrous layer 102 and preform 100. For example, fibers 210a and/or 210b may comprise a thickness, density, composition, or cross sectional shape that varies along its length.

Fibers 210a and 210b may be oriented differently relative to one another throughout annular fibrous layer 102. Such orientation may produce predetermined properties in preform 100 and, consequently, in a resulting carbon composite structure produced from preform 100. As will be discussed further, the orientation of fibers 210a and 210b and/or the characteristics of fibers 210a and 210b may be varied to produce predetermined properties in preform 100.

Annular fibrous layer 102 may comprise a radius 212 and an axis 214. In various embodiments, one or more characteristics of annular fibrous layer 102 may vary in relation to radius 212, axis 214, or both. This variation may be a result of the orientation of fibers, such as, for example, fibers 210a and 210b, and/or a result of the difference in characteristics of fibers 210a and 210b.

In various embodiments, annular fibrous layer 102 may comprise a radial segment 220. Radial segment 220 may comprise, for example, various characteristics such as areal weight, fiber volume, and fiber density, among others. In various embodiments, such characteristics may vary along a radius 212 within radial segment 220 according to a predetermined profile. For example, annular fibrous layer 102 may comprise a predetermined areal weight profile along radius 212 within radial segment 220. The areal weight profile may comprise various different areal weights along radius 212. In various embodiments, an areal weight along radius 212 at outer diameter 106 may differ from an areal weight along radius 212 at inner diameter 104. For example, along radius 212, an areal weight at outer diameter 106 may be greater than an areal weight at inner diameter 104. The areal weight profile may vary in any predetermined manner, including having little or no variance along radius 212 (e.g., a "uniform" areal weight profile). For example, a "uniform" areal weight profile may comprise a constant areal weight along the profile, including a constant areal weight along radius 212. In other embodiments, the areal weight profile may vary significantly between various points along radius 212.

In various embodiments, annular fibrous layer 102 may comprise an axial segment 222. Similarly to radial segment 220, axial segment 222 may comprise characteristics such as areal weight, fiber volume, and fiber density, among others. In various embodiments, such characteristics may vary along an axis 214 within axial segment 222 according to a predetermined profile. For example, annular fibrous layer 102 may comprise a predetermined areal weight profile along axis 214 within axial segment 222. In various embodiments, along axis 214, an areal weight at outer diameter 106 may differ from an areal weight along axis 214 at inner diameter 104. For example, along axis 214, an areal weight at first surface 108 may be greater than an areal weight at approximately half of thickness "t." An areal weight profile may vary in any predetermined manner, including little or no variance along axis 214 (a "uniform" areal weight profile), or significantly between various points along axis 214.

For example, an areal weight profile may comprise a three dimensional profile which varies along both axis 214 and radius 212. In one embodiment, the areal weight profile varies such that areal weight is generally higher in the vicinity of outer diameter 106 than inner diameter 104, and generally higher in the vicinity of first surface 108 than at approximately half of thickness "t" (e.g., the center of preform 100). The areal weight profile may vary in any manner that provides predetermined characteristics to preform 100, which may subsequently provide predetermined characteristics to a carbon composite brake pad produced from preform 100. Such predetermined characteristics of a carbon composite brake pad may include, for example, improved strength, improved wear resistance, and improved oxidation resistance, among others.

Similarly to a predetermined areal weight profile, annular fibrous layer 102 may comprise a predetermined fiber volume profile. As previously described, the characteristics and orientation of fibers such as fibers 210a and 210b may be varied to provide a predetermined fiber volume profile. In various embodiments, a predetermined fiber volume profile may vary along radius 212 of radial segment 220 and/or axis 214 of axial segment 222 to provide predetermined characteristics to a resulting carbon composite brake pad formed from preform 100. In other embodiments, the fiber volume profile may have little or no variance along radius 212 and/or axis 214.

Further, annular fibrous layer 102 may comprise a predetermined fiber density profile. In various embodiments, a predetermined fiber volume profile may vary along radius 212 of radial segment 220 and/or axis 214 of axial segment 222 to provide predetermined characteristics to a resulting carbon fiber brake pad formed from preform 100. In other embodiments, the fiber volume density may have little or no variance along radius 212 and/or axis 214.

In various embodiments, characteristics of annular fibrous layer 102 may vary at localized regions. For example, at least one of an areal weight, fiber volume, and fiber density may be greater at a localized region where additional strength, improved wear resistance, or improved oxidation resistance are predetermined. In various embodiments, preform 100 may comprise a lug section 116. Lug section 116 may, for example, couple a carbon composite structure formed from preform 100 to another component of a braking system. In such embodiments, one or more of an areal weight, fiber volume, and fiber density may be greater at or near lug section 116 than at other positions of annular fibrous layer 102 to improve the strength of the resulting carbon composite structure in and around lug section 116. Although described in relation to a specific local region of preform 100, characteristics such as areal weight, fiber volume, and fiber density may be varied in any region of annular fibrous layer 102.

Figure 3:
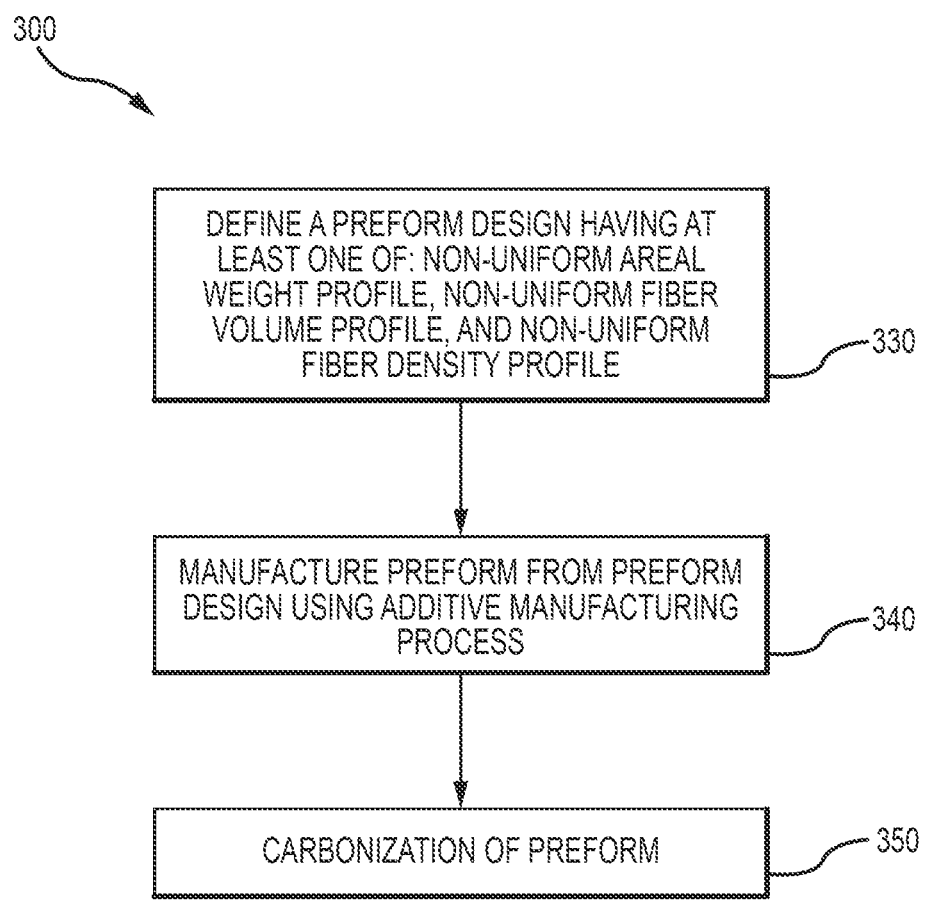
FIG. 3 is a process flow diagram for making a preform with additive manufacturing, in accordance with various embodiments.

In various embodiments and with reference to FIG. 3, a method for making a preform using additive manufacturing 300 may include defining a preform design (step 330). For example, step 330 may comprise using, among other techniques, two dimensional modeling techniques to define a preform design which comprises an annular fibrous layer having at least one of a non-uniform areal weight profile, a non-uniform fiber volume profile, or a non-uniform fiber density profile. In various embodiments, step 330 comprises designing a preform that may only be produced by an additive manufacturing technique. Such a design may include fiber properties and orientations that are not possible with conventional, fabric- or textile-based methods. Further, producing the preform in a single fibrous layer may eliminate the requirement of needling together multiple layers of fabric, which in turn may save time and expense. In addition, printing the preform in its final annular configuration may reduce waste associated with forming the preform in a rectangular configuration and reducing it to the annular configuration.

In various embodiments, the preform design of step 330 is then manufactured using an additive manufacturing technique (step 340). For example, step 340 may comprise using a three dimensional polymeric printing technique such as a fused deposition modeling process to manufacture a preform, such as preform 100, having the same configuration as the preform design of step 330.

In various embodiments, method 300 may further comprise a carbonization of the preform step 350. For example, step 350 may comprise conventional carbonization techniques which convert the preform to a carbon composite structure such as, for example, a carbon composite brake pad.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A preform for making a composite structure comprising:
   an annular fibrous layer having a first surface, an inner diameter, an outer diameter, a radius, an axis, and a thickness,
   wherein the annular fibrous layer comprises a predetermined areal weight profile, a predetermined fiber volume profile, and a predetermined fiber density profile, one of which is non-uniform.

2. The preform of claim 1, wherein the annular fibrous layer is formed by an additive manufacturing process.

3. The preform of claim 1, further comprising a lug section, wherein a fiber density profile along at least one of the radius or the axis comprises a fiber density that is greater at a point in the lug section than a fiber density at the inner diameter.

4. The preform of claim 1, wherein the predetermined areal weight profile along the radius comprises an areal weight at a point along the outer diameter which is greater than an areal weight at a point along the inner diameter.

5. The preform of claim 1, wherein the predetermined fiber volume profile along the radius comprises a fiber volume at the outer diameter which is greater than a fiber volume at the inner diameter.

6. The preform of claim 1, wherein the predetermined fiber density profile along the radius comprises a fiber density at the outer diameter which is greater than a fiber density at the inner diameter.

7. The preform of claim 1, wherein the predetermined areal weight profile along the axis comprises an areal weight along the first surface which is greater than an areal weight at approximately half of the thickness of the annular fibrous layer.

8. The preform of claim 1, wherein the predetermined fiber volume profile along the axis comprises a fiber volume along the first surface which is greater than a fiber volume at approximately half of the thickness of the annular fibrous layer.

9. The preform of claim 1, wherein the predetermined fiber density profile along the axis comprises a fiber density along the first surface which is greater than a fiber density at approximately half of the thickness of the annular fibrous layer.

10. A preform for making a composite structure comprising:
    a single annular fibrous layer having a first surface, an inner diameter, an outer diameter, a radius, an axis, and a thickness,
    wherein the single annular fibrous layer comprises a predetermined areal weight profile, a predetermined fiber volume profile, and a predetermined fiber density profile, one of which is non-uniform.

11. The preform of claim 10, wherein the single annular fibrous layer further comprises a lug section, and wherein a fiber density profile along at least one of the radius or the axis comprises a fiber density that is greater at a point in the lug section than a fiber density at the inner diameter.

12. The preform of claim 10, wherein the predetermined areal weight profile along the radius comprises an areal weight at a point along the outer diameter which is greater than an areal weight at a point along the inner diameter.

13. The preform of claim 10, wherein the predetermined fiber volume profile along the radius comprises a fiber volume at the outer diameter which is greater than a fiber volume at the inner diameter.

14. The preform of claim 10, wherein the predetermined fiber density profile along the radius comprises a fiber density at the outer diameter which is greater than a fiber density at the inner diameter.

15. The preform of claim 10, wherein the predetermined areal weight profile along the axis comprises an areal weight along the first surface of the single annular fibrous layer which is greater than an areal weight at approximately half of the thickness of the single annular fibrous layer.

16. The preform of claim 10, wherein the predetermined fiber volume profile along the axis comprises a fiber volume along the first surface which is greater than a fiber volume at approximately half of the thickness of the single annular fibrous layer.

17. The preform of claim 10, wherein the predetermined fiber density profile along the axis comprises a fiber density along the first surface which is greater than a fiber density at approximately half of the thickness of the single annular fibrous layer.

18. A preform for making a composite structure comprising:
  a single annular fibrous layer additively manufactured and having a first surface, an inner diameter, an outer diameter, a radius, an axis, and a thickness,
    wherein the annular fibrous layer comprises a predetermined areal weight profile, a predetermined fiber volume profile, and a predetermined fiber density profile, one of which is non-uniform.

* * * * *